US006898604B1

(12) United States Patent
Ballinger et al.

(10) Patent No.: US 6,898,604 B1
(45) Date of Patent: May 24, 2005

(54) XML SERIALIZATION AND DESERIALIZATION

(75) Inventors: Keith W. Ballinger, North Bend, WA (US); Erik B. Christensen, Seattle, WA (US); Stefan H. Pharies, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 503 days.

(21) Appl. No.: 09/894,829

(22) Filed: Jun. 29, 2001

(51) Int. Cl.$^7$ .............................................. G06F 17/30
(52) U.S. Cl. ...................... 707/101; 707/103; 715/513
(58) Field of Search ................................ 707/101, 103, 707/100, 104; 715/507, 513; 719/318; 717/107

(56) References Cited

U.S. PATENT DOCUMENTS

| 5,748,890 A | 5/1998 | Goldberg et al. |
| 5,812,996 A | 9/1998 | Rubin et al. |
| 5,897,622 A | 4/1999 | Blinn et al. |

(Continued)

FOREIGN PATENT DOCUMENTS

| EP | 01111679 A2 | 12/2000 |
| WO | WO 98/21651 | 5/1998 |
| WO | WO 98/44695 | 10/1998 |
| WO | WO 99/34288 | 7/1999 |

OTHER PUBLICATIONS

Wu, Dapeng; Hou, Yiwci Thomas; Zhang, Ya–Qin; "Scalable Video Transport over Wireless IP Networks"; IEEE 2000; pp. 1185–1191.

Dobson, Rick; "Data Binding in Dynamic HTML"; DBMS Mar. 1998 pp. 47–52.

Penn, Gerald; Hu, Jianying; Luo, Hengbin; McDonald, Ryan; "Flexible Web Document Analysis for Delivery to Narrow–Bandwidth Devices"; IEEE 2001; pp. 1074–1078.

Esposito, Dino; "Heaven Sent"; Developer Network Journal issue Mar./Apr. 23, 2001 pp. 18–24.

Hovanes, Michael E.; Deal, John R. Grizz; Rowberg, Alan H.; "Seamless Multiresolution Display of Portable Wavelet–Compressed Images" Journal of Digital Imaging, vol. 12, No. 2, suppl May 1, 1999, pp. 109–111.

Ingham; David B; "W3Objects: A Distributed Object–Oriented Web Server" Object–Oriented Web Servers and data Modeling Workshop, Sixth International World Wide Web Conference, Apr. 7, 1997, Santa Clara, CA 4 pages.

(Continued)

*Primary Examiner*—Sanjiv Shah (57) ABSTRACT

An object instance is serialized to a serial format, such as an eXtensible Markup Language (XML) document, based on a mapping between an arbitrary annotated source code file and a schema. The arbitrary annotated source code contains at least one programming type that describes a shape of an object instance and the schema describes a format of a document having a serial format. The mapping defines a correspondence between the shape of the object instance and the format of the document having the serial format. Subsequently, an object instance is converted to the serial format by converting public properties, public fields and method parameters of the object instance to a document having the serial format based on the mapping. Once the mapping is defined, an XML document can also be converted to an object instance based on the mapping.

58 Claims, 2 Drawing Sheets

U.S. PATENT DOCUMENTS

| | | | |
|---|---|---|---|
| 5,940,075 A | | 8/1999 | Mutschler, III et al. |
| 5,953,524 A | | 9/1999 | Meng et al. |
| 5,961,601 A | | 10/1999 | Iyengar |
| 5,983,227 A | | 11/1999 | Nazem et al. |
| 5,991,802 A | | 11/1999 | Allard et al. |
| 6,014,666 A | | 1/2000 | Helland et al. |
| 6,032,207 A | | 2/2000 | Wilson |
| 6,076,108 A | | 6/2000 | Courts et al. |
| 6,108,717 A | | 8/2000 | Kimura et al. |
| 6,178,461 B1 | | 1/2001 | Chan et al. |
| 6,185,608 B1 | | 2/2001 | Hon et al. |
| 6,205,480 B1 | | 3/2001 | Broadhurst et al. |
| 6,212,192 B1 | | 4/2001 | Mirashrafi et al. |
| 6,230,160 B1 | | 5/2001 | Chan et al. |
| 6,247,044 B1 | | 6/2001 | Gosling et al. |
| 6,253,228 B1 | | 6/2001 | Ferris et al. |
| 6,292,933 B1 | * | 9/2001 | Bahrs et al. ............... 717/107 |
| 6,351,767 B1 | | 2/2002 | Batchelder et al. |
| 6,370,561 B1 | | 4/2002 | Allard et al. |
| 6,373,841 B1 | | 4/2002 | Goh et al. |
| 6,397,253 B1 | | 5/2002 | Quinlan et al. |
| 6,405,241 B2 | | 6/2002 | Gosling et al. |
| 6,460,141 B1 | | 10/2002 | Olden |
| 6,480,894 B1 | | 11/2002 | Courts et al. |
| 6,487,665 B1 | | 11/2002 | Andrews et al. |
| 6,557,038 B1 | | 4/2003 | Becker et al. |
| 6,622,168 B1 | | 9/2003 | Datta |
| 6,654,932 B1 | * | 11/2003 | Bahrs et al. ............... 715/507 |
| 6,675,228 B1 | * | 1/2004 | Bahrs et al. ............... 719/318 |
| 2001/0054020 A1 | | 12/2001 | Barth et al. |
| 2002/0008703 A1 | | 1/2002 | Merrill et al. |
| 2003/0009519 A1 | | 1/2003 | Gosling et al. |
| 2003/0009567 A1 | | 1/2003 | Farouk |
| 2003/0018827 A1 | | 1/2003 | Gutherie et al. |
| 2003/0025728 A1 | | 2/2003 | Ebbo et al. |
| 2003/0028565 A1 | | 2/2003 | Landsman et al. |
| 2003/0074634 A1 | | 4/2003 | Emmelmann |

OTHER PUBLICATIONS

Kunz, T.; El Shentenawy, M.; Gaddah, A.; Hafez, R.; Image Transcoding for Wireless WWW Access: The User Perspective; Multimedia Computing and Netorking 2002, Proceedings of SPIE vol. 467 (2002) pp. 28–33.
"OOP Launches Hammock at JavaOne" http://www.oop.com/pr2000_06_08.jsp?gui=Plain Jun. 8, 2000, 1 page.
"Hammock: Think of it as Swing for the Web"; Jul. 14, 2000; 10 pages.
Hammond, Eric "Hammock Swings through Web interfaces" www.infoworld.com/articles/mt/xml/00/07/17/000717mthammock.xml; Jul. 14, 2000; 3 pages.
Duan, Nick N.; "Distributed Database Access in a Corporate Environment Using Java" Bell Atlantic Corporation; 1996; 8 pages.
Nadamoto, Akiyo; Kondo, Hiroyuki; Tanaka, Katsumi; "WebCarousel: Restructuring Web Search Results for Passive Viewing in Mobile Environments" IEEE 2001 p. 164–165.
Developing ASP–Based Applications: Microsoft 1996, 5 pages.
"ColdFusion: Web Application Server"; Allair Corp; www.allair.com; 1995–1999; 28 pages.
"Alterego Networks Introduces First Mobile Web Server for Enterprises, Telcos and Providers"; Redwood City, CA; Nov. 14, 2000; 3 pages.
"Bluestone Software Layes Foundation for Internet Operating Environment with Total–E–Server . . . " Screaming Media, Business Wire; Jun. 5, 2000; 3 pages.
Stewart, Tony; "The Document as Application: Issues and Implications" GCA XML Europe 1999; pp. 575–599.
Franklin, Keith; "Supercharge Data Binding"; Visual Basic Programmer's Journal, Mar. 2000; 7 pages.
Shapiro, Marc; "A Binding Protocol for Distributed Shared Objects" Presented at 14th International Conference on Distributed Comp. Sys.; Jun. 21–24, 1994; 17 pages.
"Best Practices for Creating Adaptive User Interfaces with the Mobile Internet Toolkit"; Microsoft Corporation, Jan. 2002; 15 pages.
"Best Practices for the Microsoft Mobile Internet Toolkit Image Control"; Microsoft Corporation, Feb. 2002.
Marshall, James; "HTTP Made Really Easy: A Practical Guide to Writing Clients and Servers"; Aug. 15, 1997; 14 pages.
Chapter 3, "Mechanics of Developing JavaScript Applications"; Server–Side Javascript Guide; Online! 1999; pp 51–108 www.developer.netscape.com/docs/mauals/ssjs/1_4/ssjs.pdf.
Chapter 6, "Session Mangement Service"; Server Side Javascript Guide; Online! pp 125–166 www.developer.netscape.com/docs/manuals/ssjs/1_4/ssjs.pdf.
Anderson, Richard; Homer, Alex; Howard, Rob; Sussman, Dave; "A Preview of Active Server Pages+"; Copyright 2000, Wrox Press, pp. 1–73.
"HTML Encyclopaedia"; http://www.scit.wlv.ac.uk/encyc/form.html; 1995–1998 2 pages.
"A Brief History of Hypertext" Microsoft Corporation, 1996, 1 page.
Frost, Jim; "Windows NT Security"; May 4, 1995; 7 pages; http://world.std.com/~jimf/papers/nt–security/nt–security.html.
Davulcu, Hasan; Freire, Juliana; Kifer, Michael; Ramakrishnan, I.V.; "A Layered Architecture for Querying Dynamic Web Content"; ACM 1999; pp. 491–502.
Kitayama, Fumihiko; Hirose, Shin–Ichi; Kondoh, Goh; Kuse, Kazushi; "Design of a Framework for Dynamic Content Adaptation to Web–Enabled Terminals and Enterprise Applications"; IEEE 1999, pp. 72–79.
European Search Report 01111678.7–2201.
European Search Report 01111680.3–2201.
European Search Report 01111681.1–2201.
European Search Report 01111682.9–2201.
Solomon, David A. "Inside Windows NT, Second Edition"; Microsoft Press 1998; pp. 310–319.
Custer, Helen; "Inside Windows NT"; Microsoft Press 1993; pp. 74–81.

* cited by examiner

XML SERIALIZATION AND DESERIALIZATION

BACKGROUND OF THE INVENTION

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Field of the Invention

The invention relates to a method for converting an object instance into a serial format and for creating object instances based on a serially-formatted description of data. More particularly, the present invention relates to a method for serializing an object instance into an eXtensible Markup Language (XML) document or deserializing an XML document into an object instance.

2. Background of the Prior Art

Simple Object Access Protocol (SOAP) is conventionally used for a first program to communicate information to a second program that may be running simultaneously on the same computer as the first program or on two different computers that may or may not be running the same operating system. In that regard, SOAP is used for encoding, or serializing, defined data structures. For example, SOAP specifies exactly how an HTTP header and an XML file are serialized so that one program can send a request to another program, passing information in the request.

Nevertheless, what is needed is a way to serialize an object having an arbitrary structure into an XML document so that the structure and the information contained in the object can be communicated between two programs that may be running simultaneously on the same computer or may be running on different computers that may or may not be running different operating systems.

BRIEF SUMMARY OF THE INVENTION

The present invention provides a way to serialize an object having an arbitrary structure into an XML document so that the structure and the information contained in the object can be communicated between two programs that may be running simultaneously on the same computer, or that may be running on different computers that may or may not be running different operating systems. Additionally, the present invention can be used by a single program to save data for later use, such as after the computer on which the program is running has been turned off and then turned back on.

The advantages of the present invention are provided by a method for serializing an object instance to a serial format in which a mapping is generated between an arbitrary annotated source code file and a schema. The mapping is an internal structure used by the present invention for defining a correspondence between the shape of an object instance and the format of the document having the serial format. The arbitrary annotated source code contains programming types that describe the shape of an object instance, and the schema describes the format of a document having a serial format, such as XML. The mapping can be generated based either on an arbitrary annotated source code file or the pattern of a defined schema. After the mapping has been generated, an object instance corresponding to the arbitrary annotated source code is converted to the serial format based on the mapping by converting public properties, public fields and method parameters of the object instance to a document having the serial format. The serial format contains a shape of each class of the object instance and contains data contained within the object instance. According to the invention, the object instance is preferably converted to an XML document, although the present invention could convert an object instance to a document having a serial format other than XML, such as a custom binary format. Moreover, once the mapping has been defined, an XML document can be converted to an object instance based on the mapping.

XML schema documents and source code can also be generated from the mapping. The source code generated from the mapping describes only the data portions of programming types and does not include any logic or algorithmic statements.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Figure 1:
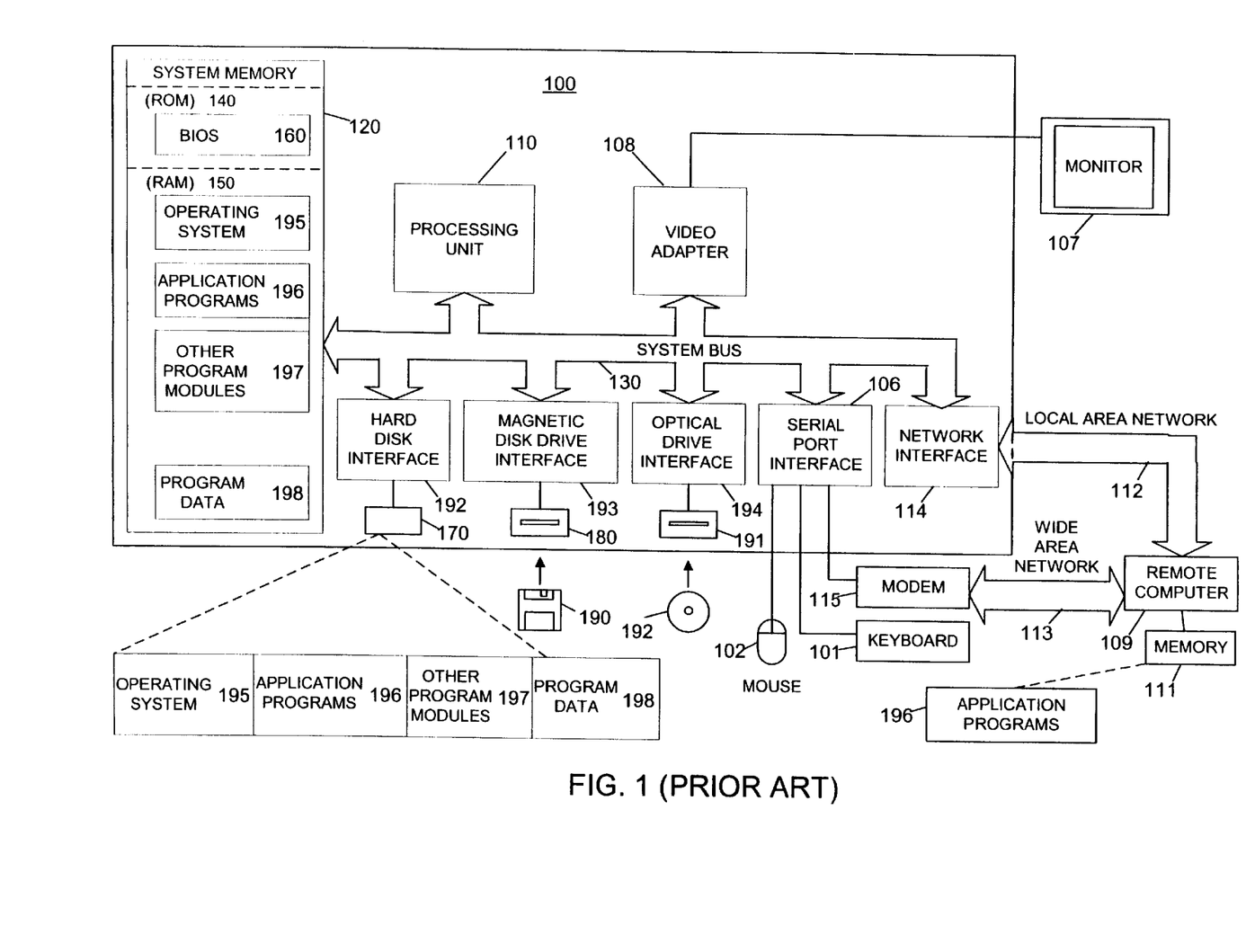
FIG. 1 shows a schematic diagram of a conventional general-purpose digital computing environment that can be used for implementing various aspects of the present invention.

The present invention may be more readily described with reference to FIGS. 1 and 2. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to processing unit 110. System bus 130 may be any of several types of bus structures including a memory bus or memory controller, a peripheral bus, and a local bus using any of a variety of bus architectures. System memory 120 includes read only memory (ROM) 140 and random access memory (RAM) 150.

A basic input/output system 160 (BIOS), containing the basic routines that help to transfer information between elements within computer 100, such as during start-up, is stored in ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. Hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on hard disk drive 170, magnetic disk 190, optical disk 192, ROM 140 or RAM 150, including an operating system 195, one or more application programs 196, other program modules 197, and program data 198. A user can enter commands and information into computer 100 through input devices such as a keyboard 101 and pointing device 102. Other input devices (not shown) may include a microphone, joystick, game pad, satellite dish, scanner or the like. These and other input devices are often connected to processing unit 110 through a serial port interface 106 that is coupled to the system bus, but may be connected by other interfaces, such as a parallel port, game port or a universal serial bus (USB). Further still, these devices may be coupled directly to system bus 130 via an appropriate interface (not shown). A monitor 107 or other type of display device is also connected to system bus 130 via an interface, such as a video adapter 108. In addition to the monitor, personal computers typically include other peripheral output devices (not shown), such as speakers and printers.

Computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, computer 100 is connected to local area network 112 through a network interface or adapter 114. When used in a WAN networking environment, personal computer 100 typically includes a modem 115 or other device for establishing a communications over wide area network 113, such as the Internet. Modem 115, which may be internal or external, is connected to system bus 130 via the serial port interface 106. In a networked environment, program modules depicted relative to personal computer 100, or portions thereof, may be stored in a remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A primary aspect of the invention provides that when a schema for a document having a serial format is known, the public properties, public fields and method parameters of an object can be converted to a document having the serial format for storage or for transport. Accordingly, deserialization of a document having a serial format recreates an object-in its original state as long as the public properties and public fields of the object comprise the entire state of the object. Preferably, the present invention serializes an instance of an object to an XML document, and deserializes an XML document to an instance of an object.

Figure 2:
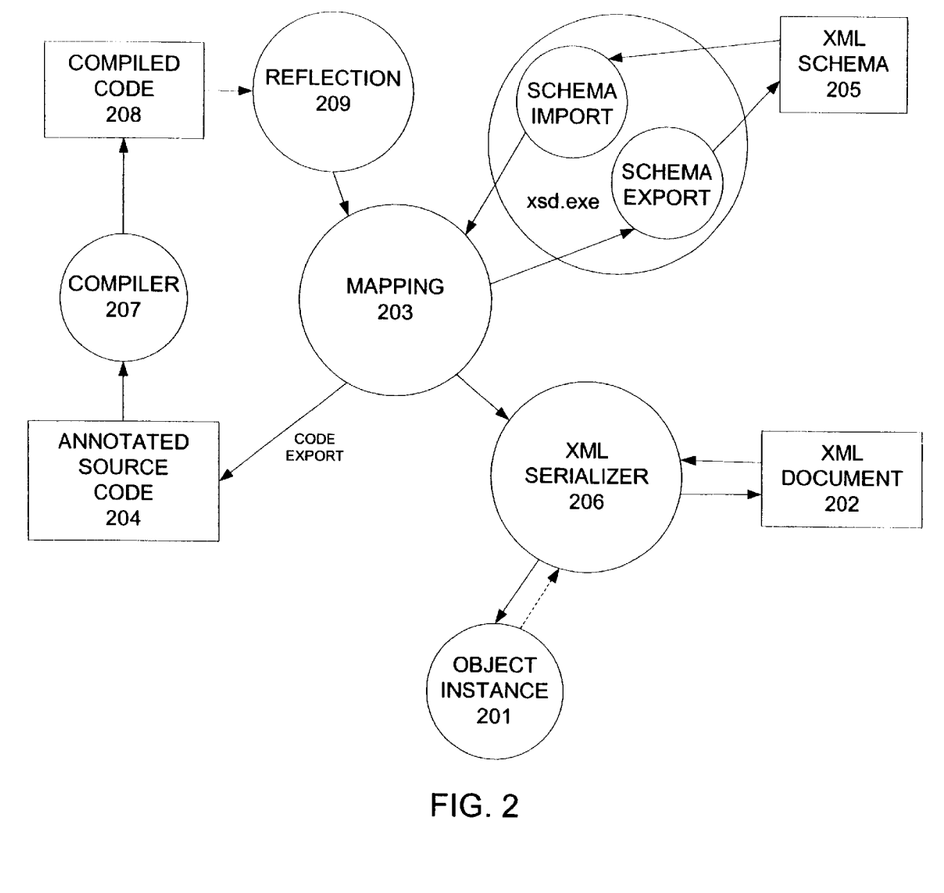
FIG. 2 shows a data flow diagram for serializing an object instance to a document having a serial format and for deserializing a document having a serial format to an object instance according to the present invention.

FIG. 2 shows a data flow diagram for serializing an object instance 201 to produce a document 202 having a serial format. According to the invention, a mapping 203 between programming language constructs contained in annotated source code 204 and an XML schema 205 (and vice-versa) is used for flowing data between an object instance 201 and an XML document 202. Similarly, mapping 203 is used for flowing data between an XML document 202 and an object instance 201. While the present invention will be described in the context of serializing an object instance to an XML document and deserializing an XML document to an object instance, the concepts of the present invention can be applied to serializing an object instance to a document having a serial format, such as a binary format, and deserializing a document having the serial format to an object instance.

A schema contains information about how the XML should look, or be arranged, when data is serialized. A programming type (a class) contains information about how the object should look, or be arranged, when deserialized. Thus, a class annotated with attributes contains information about what the object instance will look like and about how the data should be serialized into XML. Through custom attributes, these two sets of information are merged into mapping 203. It should be noted, though, that a complete mapping cannot be made solely by importing (i.e., analyzing) a schema because a schema does not contain complete information about what programming types should be created when serializing. Only the annotated source code has both sets of information. Nevertheless, it is possible to generate a mapping for the appropriate programming types using a set of predefined rules that primarily concern naming and that relate the schema to selected programming types when generating source code from a schema. Types generated from schema will have "default" names, that is, names that are usually the same names used in the schema. Another exemplary rule relates to how arrays are represented. For example, an array in code can be represented by using a conventional array or by using a collection. Each representation could be serialized in the same way in XML.

An XmlSerializer 206 and related tools, such as an XML Schema Definition (xsd.exe) tool, provide a bridge between programming language constructs/XSD schema (i.e., annotated code 204/XML schema 205) and an object instance/ XML document (i.e., object instance 201/XML document 202) at both design time and run time. The XmlSerializer 206 is generated on demand the first time it is necessary to serialize or deserialize an object instance of a given type.

When the design starting point is a given schema 205 that follows the XML Schema Definition (XSD) language that is proposed by the W3C, the XML Schema Definition (xsd.exe) tool is used for importing schema 205 and for exporting source code 204 based on schema 205. When the design starting point is annotated source code 204, annotated source code 204 is compiled at 207 to produce compiled source code 208. That is, the data in an object is described using programming language constructs such classes, fields, properties, primitive types, or arrays. Customized classes, annotated with attributes, can be also be created by the present invention. A mapping 203 is generated by reflection at 209 based on compiled annotated code 208.

Reflection is a facility provided by some programming systems, such as the Common Language Runtime (CLR) provided by Microsoft of Redmond, Wash. in the .NET Framework, for code to inspect the nature of types (classes) available on the system. For example, a programmer can write code that queries the system for a list of methods defined on a given type. The information returned would include the names of the methods, their return types, and the names and types of parameters to the methods. Reflection can also be used to determine what properties and fields exist on a type, or what types have been defined on a system.

The Common Language Runtime provided by Microsoft for the .NET environment allows code to be annotated with "custom attributes," also called "metadata." The annotations are expressed by a programmer in source code. When compiled, the annotations are stored as additional information about the classes, methods, fields, properties and parameters defined in the source code. The Runtime may then use the additional information natively, or programs can use reflection to obtain the information.

Returning to FIG. 2, an XSD schema document (.xsd) is exported by xsd.exe from mapping 203 based on the custom classes of compiled annotated code 208. Thus, an XSD schema is optional and is not needed at design time (or at run time) because the present invention can generate a suitable schema based on annotated source code.

In either design situation, i.e., starting with a given schema or starting with annotated source code, the classes are annotated with custom attributes that are used by an XmlSerializer 206 for mapping between a XSD schema system to a Common Language Runtime (CLR) environment. The CLR environment is a runtime environment and is part of the .NET framework provided by Microsoft of Redmond, Wash. The CLR provides such features as cross-language integration and cross-language exception handling among other features, for developing and executing .NET applications.

At run time, instances of classes contained within an object instance 201 are serialized by XmlSerializer 206 into an XML document 202 based on mapping 203. Similarly, an XML document 202 is deserialized by XmlSerializer 206 into a run time object instance 201 based on mapping 203. In this regard, XmlSerializer 206 provides complete and flexible control over how XML is encoded into classes. For example, a public field or public property can be encoded as an attribute or an element. An XML namespace can be specified, and an element name or attribute name can be specified when a field or property name is inappropriate. Only the shape of an object class and the data contained in the object is contained in the serialized data. The type identity and assembly information is not included in the serialized data because only public properties and public fields are serialized by XmlSerializer 206. In situations when non-public, i.e., private, data is to be serialized, a conventional binary formatting method is preferred.

The present invention provides the advantages of working with strongly-typed classes while still having the flexibility of XML. For example, by using fields or properties of type XmlElement, XmlAttribute or XmlNode in strongly typed classes, parts of the XML document instance can be read directly into XML objects. Attributes for the application programming interface (API) for XmlSerializer 206 for controlling XML output and XML input are set forth in the following table:

| Attribute Name | Use |
| --- | --- |
| SoapElementAttribute | Allows specification of a field or property that should be serialized as an element in the XML document. Allows |

-continued

| Attribute Name | Use |
| --- | --- |
| | specification of the name and namespace for that element. Applies to SOAP-encoded XML. |
| SoapEnumAttribute | Specifies the name to be used in XML Schema for the annotated enumeration. Applies to SOAP-encoded XML. |
| SoapIgnoreAttribute | Specifies that the annotated public field, property, or parameter should be ignored by the serializer and should not be represented in the schema or serial document. Applies to SOAP-encoded XML. |
| SoapIncludeAttribute | Specifies an additional type to be included in the reflection process. All types encountered when examining fields, properties, and parameters are included automatically. SoapIncludeAttribute can be used when subclasses not declared as property types Will be used. Applies to SOAP-encoded XML. |
| SoapTypeAttribute | Allows the type definition emitted in the schema document to be customized. Applies to SOAP-encoded XML. |
| XmlAnyAttributeAttribute | When deserializing, the array Will be filled with XmlElement objects that represent all XML elements unknown to the schema. Applies to "literal" (XSD-based) XML. |
| XmlAnyElementAttribute | When deserializing, the array will be filled with XmlAttribute objects that represent all XML attributes unknown to the schema. Applies to "literal" (XSD-based) XML. |
| XmlArrayAttribute | The members of an array will be generated as members of an XML array. Applies to "literal" (XSD-based) XML. |
| XmlArrayItemAttribute | Derived types that can be inserted into an array. Applies to "literal" (XSD-based) XML. |
| XmlAttributeAttribute | The class will be serialized as an XML attribute. Applies to "literal" (XSD-based) XML. |
| XmlElementAttribute | The field or property will be serialized as an XML element. Applies to "literal" (XSD-based) XML. |
| XmlEnumAttribute | The element name of an enumeration member. Applies to "literal" (XSD-based) XML. |
| XmlIgnoreAttribute | The property or field should be ignored when the containing class is serialized. Applies to "literal" (XSD-based) XML. |
| XmlIncludeAttribute | The class should be included when generating schemas (and will thus be recognized when serialized). Applies to "literal" (XSD-based) XML. |
| XmlRootAttribute | The class represents the root element of the XML document. (Use the attribute to further specify the namespace and element name. Applies to "literal" (XSD-based) XML. |
| XmlTextAttribute | That the property or field should be serialized as XML. Applies to "literal" (XSD-based) XML. |
| XmlTypeAttribute | That the class should be serialized as an XML type. Applies to "literal" (XSD-based) XML. |

The XmlAnyElementAttribute or XmlAnyAttributeAttribute attributes can be applied to fields or properties that return arrays of XmlElement, XmlAttribute or XmlNode objects for reading unmapped elements and attributes into these fields or properties. Thus, documents can be processed that have additional elements and attributes that were added after design time and that were not known when the strongly-typed classes were designed.

When a property or field returns a complex object (such as an array or a class instance), XmlSerializer 206 converts the complex object to an element nested within the main XML document. For example, the first class in the following exemplary C# code returns an instance of the second class:

```
public Class MyContainer
{
    public MyObject MyObjectProperty;
}
public class MyObject
{
    public string ObjectName;
}
```

The serialized XML output provided by XmlSerializer 206, given an instance of the classes MyContainer and MyObject, will be:

```
<MyContainer>
<MyObjectProperty>
<ObjectName>My String</ObjectName>
</MyObjectProperty>
</MyContainer>
```

For this example, "My String" is a particular value the class ObjectName in the given instance of the classes MyContainer and MyObject.

When only the states of objects are saved, the class does not need to be modified. When, however, XML documents that conform to an exact XML schema are to be read or written, the XML output of XmlSerializer 206 can be controlled by setting selected attributes of the public properties and fields of the class. As shown in the following exemplary C# code, XmlAttributeAttribute is used for specifying that the Qty field should be encoded as an XML attribute having the name Quantity. Additionally, XmlElementAttribute is used for specifying that the Name field should be encoded as an XML element having the name ProductName.

```
public class Order
{
[XmlAttribute (AttributeName = "Quantity")]
public int Qty;
[XmlElement (ElementName = "ProductName")]
public string Name;
}
```

After serialization by XmlSerializer 206, the XML code appears as:

```
<Order Quantity = '15'>
<ProductName>.NET</ProductName>
</Order>
```

When XmlSerializer 206 deserializes an instance of the class Order, the ElementName and AttributeName properties describe how to treat the properties named Qty and Name so that XmlSerializer 206 accurately reconstructs the object with the correct field and property values.

The following exemplary code also illustrates that each public field or public property of an object can be controlled by attributes:

```
using System;
using System.Xml;
using System.Xml.Serialization;
using System.IO;
/* The XmlRootAttribute allows you to set an alternate name
   (PurchaseOrder)of the XML element, the element namespace; by
   default, the XmlSerializer uses the class name. The attribute
   also allows you to set the XML namespace for the element. Lastly,
   the attribute sets the IsNullable property, which species whether
   the xsi:null attribute appears if the class instance is sset to
   a null reference. */
[XmlRootAttribute("PurchaseOrder",
Namespace="http://www.cpandl.com",
IsNullable=false)]
public class PurchaseOrder
{
   public Address ShipTo;
   public string OrderDate;
   /* The XmlArrayAttribute changes the XML element name
      from the default of "OrderedItems" to "Items". */
   [XmlArrayAttribute("Items")]
   public OrderedItem[] OrderedItems;
   public decimal SubTotal;
   public decimal ShipCost;
   public decimal TotalCost;
}
public class Address
{
   /* The XmlAttribute instructs the XmlSerializer to serialize the Name
      field as an XML attribute instead of an XML element (the default
      behavior). */
   [XmlAttribute]
   public string Name;
   public string Line1;
   /* Setting the IsNullable property to false instructs the
      XmlSerializer that the XML element will not appear if
      the City field is set to a null reference. */
   [XmlElementAttribute(IsNullable = false)]
   public string City;
   public string State;
   public string Zip;
}
public class OrderedItem
{
   public string ItemName;
   public string Description;
   public decimal UnitPrice;
   public int Quantity;
   public decimal LineTotal;
   /* Calculate is a custom method that calculates the price per item,
      and stores the value in a field. */
   public void Calculate()
   {
      LineTotal = UnitPrice * Quantity;
   }
}
public class Test
{
   public static void Main()
   {
      string filename="po.xml";
      // Create an instance of the XmlSerializer class;
      // specify the type of object to serialize.
      XmlSerializer serializer =
      new XmlSerializer(typeof(PurchaseOrder));
      TextWriter writer = new StreamWriter(filename);
      PurchaseOrder po=new PurchaseOrder();
      // Create an address to ship and bill to.
      Address billAddress = new Address();
      billAddress.Name = "Rita Hernandez";
      billAddress.Line1 = "1 Main St.";
      billAddress.City = "AnyTown";
      billAddress.State = "WA";
      billAddress.Zip = "00000";
      // Set ShipTo and BillTo to the same addressee.
```

-continued

```
        po.ShipTo = billAddress;
        po.OrderDate = System.DateTime.Now.ToLongDateString();
        // Create an OrderedItem object.
        OrderedItem i1 = new OrderedItem();
        i1.ItemName = "Widget S";
        i1.Description = "Small widget";
        i1.UnitPrice = (decimal) 5.23;
        i1.Quantity = 3;
        i1.Calculate();
        // Insert the item into the array.
        OrderedItem [] items = {i1};
        po.OrderedItems = items;
        // Calculate the total cost.
        decimal subTotal = new decimal();
        foreach(OrderedItem oi in items)
        {
          subTotal += oi.LineTotal;
        po.SubTotal = subTotal;
        po.ShipCost = (decimal) 12.51;
        po.TotalCost = po.SubTotal + po.ShipCost;
        // Serialize the purchase order, and close the TextWriter.
        serializer.Serialize(writer, po);
        writer.Close();
      }
    }
``` creates the following XML (in the file referred to as po.xml):

```
<?xml version="1.0"encoding="utf-8"?>
<PurchaseOrder xmlns: xsi="http://www.w3.org/2001/XMLSchema-
instance"
xmlns:xsd="http://www.w3.org/2001/XMLSchema"
xmlns="http://www.cpandl.com">
  <ShipTo Name="Rita Hernandez">
    <Line1>1 Main St.</Line1>
    <City>AnyTown</City>
    <State>WA</State>
    <Zip>00000</Zip>
  </ShipTo>
  <OrderDate>Tuesday, June 26, 2001</OrderDate>
  <Items>
    <OrderedItem>
      <ItemName>Widget S</ItemName>
      <Description>Small widget</Description>
      <UnitPrice>5.23</UnitPrice>
      <Quantity>3</Quantity>
      <LineTotal>15.69</LineTotal>
    </OrderedItem>
  </Items>
```

-continued

```
  <SubTotal>15.69</SubTotal>
  <ShipCost>12.51</ShipCost>
  <TotalCost>28.2</TotalCost>
</PurchaseOrder>
```

Notice the following general features of source code annotation:

Classes, properties, fields, methods, parameters, and other language elements can be annotated with "custom attributes."

In the C# language, the syntax for annotating these language elements is to place the name of a custom attribute inside square brackets just before the item being annotated. Additional data is provided to the custom attribute inside parentheses following the attribute name.

System.XmlSerialization.XmlSerializer is the main class used for XML Serialization. The previous example illustrates how to use System.XmlSerialization.XmlSerializer for serializing an object instance to XML by calling the Serialize method. Similarly, an object can be deserialized using the Deserialize method, which takes a stream from which to read the XML document and returns the deserialized object.

An exemplary use of the XML Definition Tool (Xsd.exe) could be that of a developer tasked with developing an application for processing XML documents that must conform to a specific XML schema (.xsd) document, such as a particular purchase order. Orders that conform to the XML schema are processed and a confirmation reply is sent to each customer. The specific XML schema is passed to the XML Schema Definition tool (Xsd.exe) as an argument, and the XML Schema Definition tool creates a set of classes that are precisely matched to the specified XML schema. According to the invention, the XML Schema Definition tool processes only schemas that conform to the www.w3.org Proposed Recommendation XMLSchema specification set forth at http://www.w3.org/2001/XMLSchema. The classes having methods, properties, or fields are annotated, as required, by the reflection portion of the invention (i.e., reflection 209 in FIG. 2) for the specific XML schema.

Xsd.exe will produce the following schema for the classes used in the previous example:

```
<?xml version="1.0"encoding="utf-8"?>
<xs:schema xmlns:tns="http://www.cpandl.com"
attributeFormDefault="qualified"elementFormDefault="qualified"
targetNamespace="http://www.cpandl.com"
xmlns:xs="http://www.w3.org/2001/XMLSchema">
  <xs:element name="PurchaseOrder" type="tns:PurchaseOrder"/>
  <xs:complexType name="PurchaseOrder">
  <xs:sequence>
    <xs:element minOccurs="0"maxOccurs="1" name="ShipTo"
type="tns:Address"/>
    <xs:element minOccurs="0"maxOccurs="1" name="OrderDate"
type="xs:string"/>
    <xs:element minOccurs="0"maxOccurs="1" name="Items"
type="tns:ArrayOfOrderedItem"/>
    <xs:element minOccurs="0"maxOccurs="1" name="SubTotal"
type="xs:decimal"/>
    <xs:element minOccurs="1"maxOccurs="1" name="ShipCost"
type="xs:decimal"/>
    <xs:element minOccurs="1"maxOccurs="1" name="TotalCost"
```

```
type="xs:decimal"/>
  </xs:sequence>
</xs:complexType>
<xs:complexType name="Address">
  <xs:sequence>
    <xs:element minOccurs="0" maxOccurs="1"name="Line1" type="xs:string"
/>
    <xs:element minOccurs="0" maxOccurs="1"name="City" type="xs:string"/>
    <xs:element minOccurs="0" maxOccurs="1"name="State" type="xs:string"
/>
    <xs:element minOccurs="0" maxOccurs="1"name="Zip" type="xs:string"/>
  </xs:sequence>
  <xs:attribute name="Name" type="xs:string"/>
</xs:complexType>
<xs:complexType name="ArrayOfOrderedItem">
  <xs:sequence>
    <xs:element minOccurs="0" maxOccurs="unbounded"name="OrderedItem"
type="tns:OrderedItem"/>
  </xs:sequence>
</xs:complexType>
  <xs:complexType name="OrderedItem">
    <xs:sequence>
      <xs:element minOccurs="0" maxOccurs="1" name="ItemName"
type="xs:string" />
     <xs:element minOccurs="0" maxOccurs="1" name="Description"
type="xs:string" />
     <xs:element minOccurs="1" maxOccurs="1" name="UnitPrice"
type="xs:decimal"/>
     <xs:element minOccurs="1" maxOccurs="1" name="Quantity" type="xs:int"
/>
     <xs:element minOccurs="1" maxOccurs="1"0 name="LineTotal"
type="xs:decimal"/>
   </xs:sequence>
  </xs:complexType>
</xs:schema>
```

Similarly, running xsd.exe on that schema would produce classes that look substantially like the classes originally written for the example.

The application for processing the XML documents conforming to a specific XML purchase order schema is then created using XmlSerializer 206 for reading and processing XML documents, and for generating new XML documents confirming orders. To do this, XmlSerializer 206 serializes and deserializes the classes created by the XML Schema Definition tool.

Xml Serialization can serialize the parameters of a method in much the same way that a class is serialized. For example, Xml Serialization of attributes for Web Services also allows flexible sets of Web Services to be created and easily shape the Simple Object Access Protocol (SOAP) that a Web Service expects and responds with. There are two sets of Xml Serialization attributes for Web Services: one attribute set for services described literally by an XSD document, and another attribute set for services that use the SOAP encoding, as defined in Section 5 of the SOAP spec, http://www.w3.org/TR/SOAP/.

For literal services, the attributes listed above can be used for controlling the shape, or arrangement, of the XML document that is being sent to a web service. For example, the following C# code:

```
<%@WebService language="c#" class="SimpleTest"%>
using System;
using System.Xml;
using System.Xml.Serialization;
using System.Web.Services;
using system.Web.Services.Protocols;
```

```
public class SimpleTest {
  [WebMethod]
  [SoapDocumentMethod(ParameterStyle=SoapParameterStyle.Bare)]
  public Data SendData(Data x) {
    return x;
  }
}
public class Data {
  [XmlElement("TheInt")]
  public int MyInt;
  [XmlAttribute("str")]
  public string MyString;
}
``` creates the following Xml for SOAP:

```
Request:
POST /test.asmx HTTP/1.1
Host: localhost
Content-Type: text/xml; charset=utf-8
Content-Length: length
SOAPAction: "http://tempuri.org/SendData"
<? xml version="1.0" encoding="utf-8"?>
<soap:Envelope xmlns:xsi="http://www.w3.org/2001/XMLSchema-
instance"
 xmlns:xsd="http://www.w3.org/2001/XMLSchema"
 xmlns:soap="http://schemas.xmlsoap.org/soap/envelope/">
  <soap:Body>
    <x str="string" xmlns="http://tempuri.org/">
      <TheInt>int</TheInt>
    </x>
  </soap:Body>
</soap:Envelope>
Response:
```

-continued

```
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-
instance"
xmlns:xsd="http://www.w3.org/2001/XMLSchema"
xmlns:soap="http://schemas.xmlsoap.org/soap/envelope/">
  <soap:Body>
    <SendDataResult str="string" xmlns="http://tempuri.org/">
      <TheInt>int</TheInt>
    </SendDataResult>
  </soap:Body>
</soap:Envelope>
```

For encoded SOAP, the Soap*Attributes found within System.Xml.Serialization can be used for controlling the shape of the XML. For instance, the following C# code:

```
<%@WebService language="c#" class="SimpleTest"%>
using System;
using System.Xml;
using System.Xml.Serialization;
using System.Web.Services;
using System.Web.Services.Protocols;
```

-continued

```
public class SimpleTest {
[WebMethod]
[SoapRpcMethod]
public Data SendData(Data x) {
return x;
}
}
public class Data {
[XmlElement("TheInt")]
public int MyInt;
[XmlAttribute("str")]
public string MyString;
}
``` creates the following SOAP:

```
Request:
POST /test.asmx HTTP/1.1
Host: localhost
Content-Type: text/xml; charset=utf-8
Content-Length: length
SOAPAction: "http://tempuri.org/SendData"
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soapenc="http://schemas.xmlsoap.org/soap/encoding/"
xmlns:tns="http://tempuri.org/" xmlns:types="http://tempuri.org/encodedTypes"
xmlns:soap="http://schemas.xmlsoap.org/soap/envelope/">
  <soap:Body soap:encodingStyle="http://schemas.xmlsoap.org/soap/encoding/">
    <tns:SendData>
      <x hrefr-"#id1" />
    </tns:SendData>
    <types:Data id="id1" xsi:type="types:Data">
      <MyInt xsi:type="xsd:int">int</MyInt>
      <MyString xsi :type="xsd:string">string</MyString>
    <types:Data>
  </soap:Body>
</soap:Envelope>
Response:
HTTP/1.1 200 OK
Content-Type: text/xml; charset=utf-8
Content-Length: length
<?xml version="1.0" encoding="utf-8"?>
<soap:Envelope xmlns:xsi="http://www.w3.org/2001/XMLSchema-instance"
xmlns:xsd="http://www.w3.org/2001/XMLSchema"
xmlns:soapenc="http://schemas.xmlsoap.org/soap/encoding/"
xmlns:tns="http://tempuri.org/"xmlns:types="http://tempuri.org/encodedTypes"
xmlns:soap="http://schemas.xmlsoap.org/soap/envelope/">
  <soap:Body soap:encodingStyle="http://schemas.xmlsoap.org/soap/encoding/">
    <tns:SendDataResponse>
      <SendDataResult href="#id1"/>
    </tns:SendDataResponse>
    <types:Data id="id1" xsi:type="types:Data">
      <MyInt xsi:type="xsd:int">int</MyInt>
      <MyString xsi:type="xsd:string">string</MyString>
    </types:Data>
  </soap:Body>
</soap:Envelope>
```

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method for serializing an object instance to a serial format, the method comprising steps of:

generating a mapping between an arbitrary annotated source code file and a schema, the arbitrary annotated source code file containing at least one programming type that describes a shape of an object instance and the schema describing a format of a document having a serial format, the mapping defining a correspondence between the shape of the object instance and the format of the document having the serial format; and converting an object instance corresponding to the arbitrary annotated source code to the serial format by converting at least one of a public property, a public field and a method parameter of the object instance to a document having the serial format based on the mapping.

2. The method according to claim 1, wherein the step of converting the object instance to the document having the serial format converts the object instance to an eXtensible Markup Language (XML) document.

3. The method according to claim 1, wherein the serial format contains a shape of each class of the object instance and contains data contained within the object instance.

4. The method according to claim 1, wherein the step of generating the mapping generates the mapping based on the arbitrary annotated source code file.

5. The method according to claim 4, wherein the step of generating the mapping between the arbitrary annotated source code file and the schema includes steps of:

compiling the arbitrary annotated source code file; and generating the mapping between the arbitrary annotated source code file and the schema based on the complied arbitrary annotated source code file using reflection.

6. The method according to claim 1, wherein the step of generating the mapping generates the mapping based on a pattern of the schema.

7. The method according to claim 1, wherein the schema is an eXtensible Markup Language (XML) schema (XSD) and the document in the serial format is an XML document, the method further comprising a step of converting the XML document to the object instance based on the mapping generated between the arbitrary annotated source code file and the XML schema.

8. The method according to claim 1, wherein the arbitrary annotated source code file includes custom attributes that control a format of the object when the object is converted to the serial format.

9. A method for converting a document in a serial format to an object instance, the method comprising steps of:

generating a mapping between an arbitrary annotated source code file and a schema, the mapping defining a correspondence between a shape of an object instance and a format of a document having a serial format; and converting a document having the serial format to an object instance based on the mapping, the document in the serial format containing at least one of a public property, a public field and a method parameter of the object instance.

10. The method according to claim 9, wherein the document in the serial format is an eXtensible Markup Language (XML) document.

11. The method according to claim 9, wherein the step of generating the mapping generates the mapping based on the arbitrary annotated source code file.

12. The method according to claim 9, wherein the arbitrary annotated code includes custom attributes that control a format of the object.

13. The method according to claim 9, wherein the step of generating the mapping between the arbitrary annotated source code file and the schema includes steps of:

compiling the arbitrary annotated source code file; and generating the mapping between the arbitrary annotated source code file and the schema based on the complied arbitrary annotated source code file using reflection.

14. The method according to claim 9, wherein the step of generating the mapping generates the mapping based on a pattern of the schema.

15. The method according to claim 9, further comprising a step of converting an object instance to a document in a serial format based on the mapping generated between the arbitrary annotated source code file and the schema.

16. The method according to claim 15, wherein the step of converting the object instance to a document in the serial format converts the object instance to an eXtensible Markup Language (XML) document.

17. A computer-readable medium containing computer-executable instructions for performing steps comprising:

generating a mapping between an arbitrary annotated source code file and a schema, the arbitrary annotated source code containing at least one programming type that describes a shape of an object instance and the schema describing a format of a document having a serial format, the mapping defining a correspondence between the shape of the object instance and the format of the document having the serial format; and converting an object instance corresponding to the arbitrary annotated source code to the serial format by converting at least one of a public property, a public field and a method parameter of the object instance to a document having the serial format based on the mapping.

18. The computer-readable medium according to claim 17, wherein the step of converting the object instance to the document having the serial format converts the object instance to an eXtensible Markup Language (XML) document.

19. The computer-readable medium according to claim 17, wherein the serial format contains a shape of each class of the object instance and contains data contained within the object instance.

20. The computer-readable medium according to claim 17, wherein the step of generating the mapping generates the mapping based on the arbitrary annotated source code file.

21. The computer-readable medium according to claim 20, wherein the step of generating the mapping between the arbitrary annotated source code file and the schema includes steps of:

compiling the arbitrary annotated source code file; and generating the mapping between the arbitrary annotated source code file and the schema based on the complied arbitrary annotated source code file using reflection.

22. The computer-readable medium according to claim 17, wherein the step of generating the mapping generates the mapping based on a pattern of the schema and based on at least one predetermined rule relating the schema to at least one selected programming type.

23. The computer-readable medium according to claim 17, wherein the schema is an eXtensible Markup Language (XML) schema (XSD) and the document in the serial format is an XML document, the method further comprising a step of converting the XML document to the object instance based on the mapping generated between the arbitrary annotated source code file and the XML schema.

24. The computer-readable medium according to claim 17, wherein the arbitrary annotated source code includes custom attributes that control a format of the object when the object is converted to the serial format.

25. A computer-readable medium containing computer-executable instructions for performing steps comprising:

generating a mapping between an arbitrary annotated source code file and a schema, the mapping defining a correspondence between a shape of an object instance and a format of a document having a serial format; and converting a document having the serial format to an object instance based on the mapping, the document in the serial format containing at least one of a public property, a public field and a method parameter of the object instance.

26. The computer-readable medium according to claim 25, wherein the document in the serial format is an eXtensible Markup Language (XML) document.

27. The computer-readable medium according to claim 25, wherein the step of generating the mapping generates the mapping based on the arbitrary annotated source code file.

28. The computer-readable medium according to claim 25, wherein the arbitrary annotated code includes custom attributes that control a format of the object.

29. The computer-readable medium according to claim 25, wherein the step of generating the mapping between the arbitrary annotated source code file and the schema includes steps of:

compiling the arbitrary annotated source code file; and generating the mapping between the arbitrary annotated source code file and the schema based on the complied arbitrary annotated source code file using reflection.

30. The computer-readable medium according to claim 25, wherein the step of generating the mapping generates the mapping based on a pattern of the schema.

31. The computer-readable medium according to claim 25, further comprising a step of converting an object instance to a document in a serial format based on the mapping generated between the arbitrary annotated source code file and the schema.

32. The computer-readable medium according to claim 25, wherein the step of converting the object instance to a document in the serial format converts the object instance to an eXtensible Markup Language (XML) document.

33. A method for generating a mapping for serializing an object into a document having a serial format and for deserializing a document having a serial format into an object, the method comprising steps of:

generating a schema corresponding to an annotated source code file, the annotated source code file containing at least one programming type that describes a shape of an object instance, and the schema describing a format of a document having a serial format; and generating a mapping between the arbitrary annotated source code file and the schema, the mapping defining a correspondence between the shape of the object instance and the format of the document having the serial format.

34. The method according to claim 33, wherein the document having the serial format is an eXtensible Markup Language (XML) document.

35. The method according to claim 33, wherein the step of generating the mapping between the annotated source code file and the schema includes steps of:

compiling the annotated source code file; and generating the mapping between the annotated source code file and the schema based on the complied annotated source code file using reflection.

36. The method according to claim 33, wherein the step of generating the mapping generates the mapping based on a pattern of the schema.

37. The method according to claim 33, wherein the schema is an eXtensible Markup Language (XML) schema (XSD) and the document in the serial format is an XML document.

38. The method according to claim 33, wherein the arbitrary annotated source code includes custom attributes that control a format of the object when the object is converted to the serial format based on the mapping.

39. A computer-readable medium having computer-executable instructions for performing the steps of claim 33.

40. A method for serializing and deserializing an object, the method comprising steps of:

generating a schema corresponding to an annotated source code file, the annotated source code file containing at least one programming type that describes a shape of an object instance, and the schema describing a format of a document having a serial format; and converting an object instance corresponding to the annotated source code to the serial format by converting at least one of a public property, a public field and a method parameter of the object instance to a document having the serial format based on a mapping.

41. The method according to claim 40, wherein the schema is an eXtensible Markup Language (XML) schema (XSD) and the document in the serial format is an XML document, the method further comprising a step of converting the XML document to the object instance based on the mapping generated between the arbitrary annotated source code file and the XML schema.

42. A computer-readable medium having computer-executable instructions for performing the steps of claim 41.

43. The method according to claim 40, wherein the annotated source code includes custom attributes that control a format of the object when the object is converted to the serial format.

44. The method according to claim 40, further comprising a step of generating a mapping between the annotated source code file and the schema, the mapping defining a correspondence between the shape of the object instance and the format of the document having the serial format.

45. The method according to claim 44, wherein the step of generating the mapping between the arbitrary annotated source code file and the schema includes steps of:

compiling the arbitrary annotated source code file; and generating the mapping between the arbitrary annotated source code file and the schema based on the complied arbitrary annotated source code file using reflection.

46. The method according to claim 40, wherein the step of converting the object instance to the document having the serial format converts the object instance to an eXtensible Markup Language (XML) document.

47. The method according to claim 40, wherein the serial format contains a shape of each class of the object instance and contains data contained within the object instance.

48. A method for generating source code based on a schema, the method comprising steps of:

importing a schema describing a format of a document having a serial format; and generating source code based on the imported schema, the generated source code containing at least one programming type that describes a shape of an object instance and is related to the serial format of a document described by the schema.

49. The method according to claim 48, further comprising a step of generating a mapping based on the schema, the mapping defining a correspondence between the shape of the object instance and the format of the document having the serial format, and wherein the step of generating the source code is based on the generated mapping.

50. The method according to claim 49, wherein the step of generating the mapping generates the mapping based on a pattern of the schema.

51. The method according to claim 48, wherein the schema is an eXtensible Markup Language (XML) schema (XSD) and the document in the serial format is an XML document.

52. The method according to claim 48, wherein the serial format contains a shape of each class of an object instance corresponding to the generated source code.

53. A computer-readable medium having computer-executable instructions for performing the steps of claim 48.

54. A method for generating a schema based on source code, the method comprising steps of:

importing an annotated source code file containing at least one programming type that describes a shape of an object instance; and generating a schema based on the imported annotated source code, the generated schema describing a format of a document having a serial format.

55. The method according to claim 54, wherein the step of importing the annotated source code file includes steps of:

compiling the annotated source code file; and generating a mapping based on the compiled annotated source code file using reflection.

56. The method according to claim 54, wherein the schema is an eXtensible Markup Language (XML) schema (XSD) and the document in the serial format is an XML document.

57. The method according to claim 56, wherein the serial format contains a shape of each class of the object instance.

58. A computer-readable medium having computer-executable instructions for performing the steps of claim 54.

* * * * *